(12) United States Patent
Zbib

(10) Patent No.: US 7,653,569 B1
(45) Date of Patent: Jan. 26, 2010

(54) SYSTEMS AND METHODS FOR DELIVERING ADVERTISEMENTS

(75) Inventor: Oussama Zbib, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 679 days.

(21) Appl. No.: 10/068,210

(22) Filed: Feb. 6, 2002

(51) Int. Cl.
*G06Q 30/00* (2006.01)

(52) U.S. Cl. .............................. 705/14; 705/10; 705/26; 705/27; 707/3; 709/203; 455/419; 455/456

(58) Field of Classification Search .................... 705/14, 705/26, 27, 10; 340/425.5; 455/419, 456; 709/203; 725/109, 93; 370/401; 707/3
See application file for complete search history.

(56) References Cited

U.S. PATENT DOCUMENTS

| | | | |
|---|---|---|---|
| 5,826,241 A * | 10/1998 | Stein et al. ..................... 705/26 |
| 5,950,190 A * | 9/1999 | Yeager et al. ................... 707/3 |
| 6,314,451 B1 * | 11/2001 | Landsman et al. .......... 709/203 |
| 6,545,596 B1 * | 4/2003 | Moon ....................... 340/425.5 |
| 6,697,786 B2 * | 2/2004 | Speicher ...................... 705/14 |
| 6,744,753 B2 * | 6/2004 | Heinonen et al. ........... 370/338 |
| 6,829,475 B1 * | 12/2004 | Lee et al. .................... 455/419 |
| 6,898,571 B1 * | 5/2005 | Val et al. ...................... 705/14 |
| 7,085,806 B1 * | 8/2006 | Shapira ...................... 709/203 |
| 7,203,674 B2 * | 4/2007 | Cohen ........................... 707/3 |
| 2002/0002552 A1 * | 1/2002 | Schultz et al. ................. 707/3 |
| 2002/0010623 A1 * | 1/2002 | McCollom et al. ............ 705/14 |
| 2002/0032035 A1 * | 3/2002 | Teshima ..................... 455/456 |
| 2002/0046084 A1 * | 4/2002 | Steele et al. .................. 705/14 |
| 2002/0046118 A1 * | 4/2002 | Minte .......................... 705/14 |
| 2002/0052666 A1 * | 5/2002 | Fukatsu et al. ............. 700/107 |
| 2002/0078160 A1 * | 6/2002 | Kemp et al. ................. 709/208 |
| 2002/0133494 A1 * | 9/2002 | Goedken ...................... 707/10 |
| 2002/0147659 A1 * | 10/2002 | Hong et al. ................... 705/26 |
| 2006/0036995 A1 * | 2/2006 | Chickles et al. ............. 717/109 |
| 2007/0124165 A1 * | 5/2007 | Eckel ............................ 705/1 |

OTHER PUBLICATIONS

Page 288 of "Microsoft Press Computer Dictionary"; Third edition; 1997, Microsoft Press, Redmond-Washington, USA.*

* cited by examiner

*Primary Examiner*—Yogesh C Garg
(74) *Attorney, Agent, or Firm*—Thomas, Kayden, Horstemeyer & Risley, LLP

(57) ABSTRACT

A system for retrieving information about an advertisement that was viewed or heard by an individual. The system includes an advertisement content server having at least one file containing information about the advertisement and a device for accessing the information via a communications network. The content server enables the individual, using the device, to retrieve a subset of the information based on a limited knowledge of the individual concerning the advertisement.

17 Claims, 5 Drawing Sheets

SYSTEMS AND METHODS FOR DELIVERING ADVERTISEMENTS

BACKGROUND OF THE INVENTION

An experience common to many is the exposure to advertisements in audio or visual formats, or combinations of the two. For example, a person driving an automobile and listening to a local radio station will inevitably be exposed to commercials from a wide variety of individuals, businesses and like entities. As is often the case, the individual glosses over the advertisements or commercials. Although advertisements are structured to capture one's attention, the constant bombardment from advertisers often leads to sensory overload. The result—the individual forgets most, if not all, of the information provided in the advertisement. The process of ignoring advertisements and not committing to memory the information being provided can lead one to inadvertently overlook or gloss over an advertisement that contains information of interest to the individual.

Another common occurrence is switching to a station in the middle of an advertisement broadcast so that the listener has not had an opportunity to hear all of the pertinent information. A yet further occurrence is when one hears an advertisement of interest while driving, but does not have a pen and paper available to write down the information. One has to commit the information to memory, which may lead to inaccurate recordation of the pertinent information.

Presently, the options for retrieving the information are limited. If provided over a radio broadcast for example, the individual can continue listening to the broadcast in the hope that the advertisement will be replayed. Another option is to contact the broadcasting entity to request the desired information. This, of course, requires knowing the name of the broadcast entity. If not known, the individual will have to engage in further investigation for the sole purpose of retrieving information about an advertisement.

Another example of overlooked advertisement information involves the placement of advertisements on billboards. Billboard advertisements require an individual to physically pass by the billboard in order to be exposed to the advertisement. If an individual passes a billboard advertisement, but only glances at the billboard long enough to realize the information is of interest, the individual has to alter his or her course of travel to pass by the billboard a second time in order to review the information contained in the advertisement. This is often not feasible or is substantially inconvenient if the billboard is visible from a highway with few off-ramps near the billboard location.

Television provides a further example of advertisement sources that can be easily overlooked. Whether the individual is channel surfing and catches only a glimpse of an advertisement, and does not remember on which channel the advertisement was broadcast, or glosses over an advertisement as a matter of habit, the result is the same—advertisement information of interest that cannot be easily retrieved. The individual is again left with few options to retrieve the information from the advertisement of interest.

SUMMARY OF THE INVENTION

The present invention is directed to, in one embodiment, a system for retrieving information about an advertisement that was viewed or heard by an individual. The system includes an advertisement content server having at least one file containing information about the advertisement and a device for accessing the information via a communications network. The content server enables the individual, using the device, to retrieve a subset of the information based on a limited knowledge of the individual concerning the advertisement.

The present invention is also directed to, in another embodiment, a method for managing advertisement information about an advertisement. The method includes storing the information about the advertisement in an advertisement content server. The method also includes enabling an individual, using a device that is in communication with the content server, to search the information based on a limited knowledge of the individual concerning the advertisement. The method further includes transmitting a subset of the information to the device.

DETAILED DESCRIPTION OF THE INVENTION

The invention provides a means to retrieve information about an advertisement seen, heard or somehow perceived by an individual. For any of a variety of reasons, the individual perceiving the advertisement does not commit to memory sufficient information contained in the advertisement so as to be able to purchase or obtain the goods or services portrayed in the advertisement.

For purposes of this invention, "broadcast entity" shall mean any facility that transmits visual and/or audio signals receivable by consumers. Stationary non-transmitting devices used to publish advertisements, e.g., billboards, also are to be considered as being broadcast entities for purposes of this description. "Advertisement entity" shall mean any individual, business, corporation or like entity that utilizes advertising as a vehicle to offer and sell goods and/or services to consumers.

Figure 1:
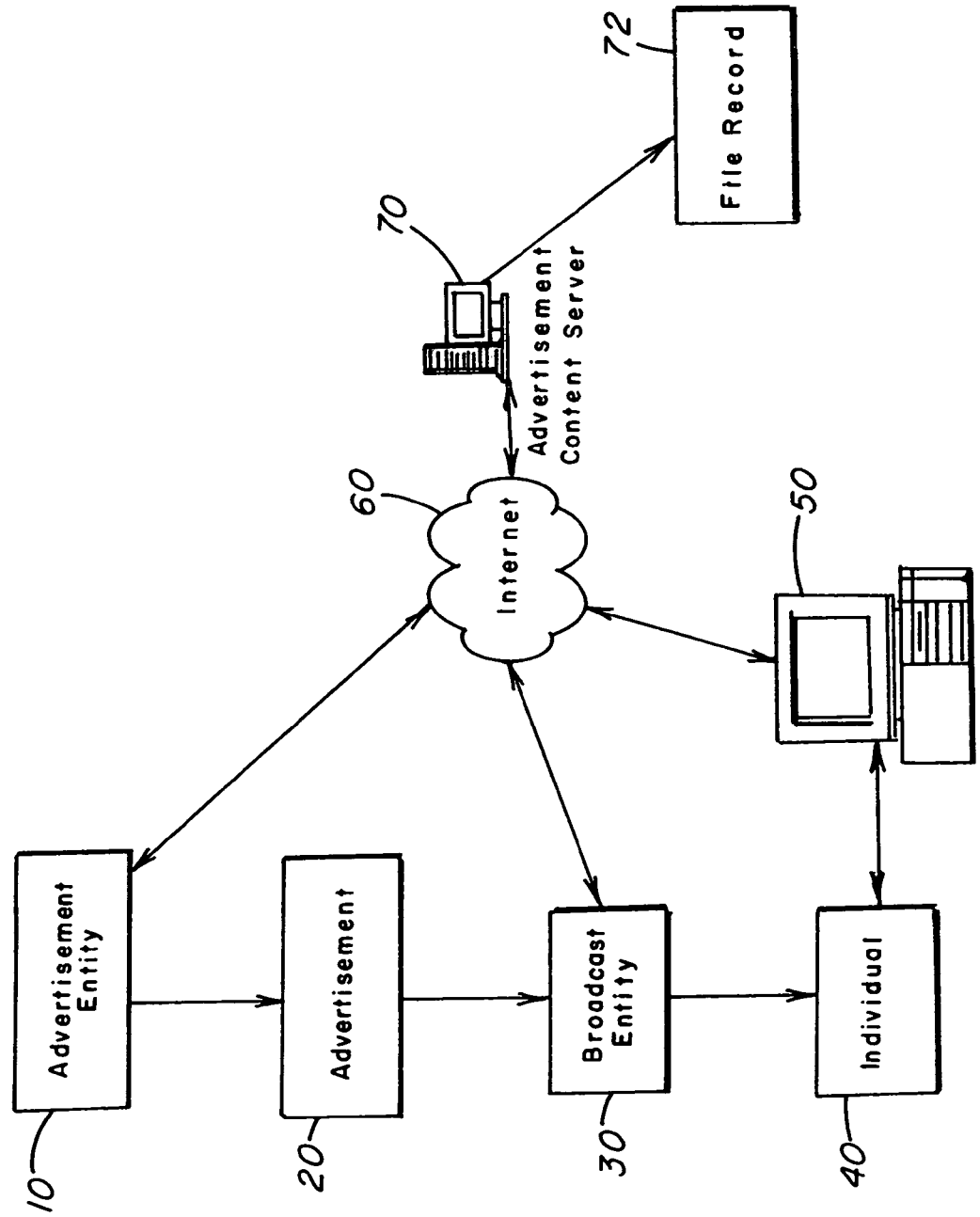
FIG. 1 is a schematic of an apparatus for retrieving information relating to an advertisement via a computer according to one embodiment of the invention.

FIG. 1 shows the basic elements of events that require accessing an advertisement database and the apparatus used to access and retrieve information from an advertisement database according to one embodiment of the invention. An entity employing an advertisement to publicize goods and/or services, designated as the Advertisement Entity 10, commissions the creation of, or creates, an Advertisement 20. As is commonly known, advertisements generally include information about a particular product or service, and contact and other information, e.g., address information and information about the entity commissioning or creating the advertisement. Advertisement 20 is publicized via any of a number of broadcast entities 30. To illustrate the principal components of the invention, a radio station will be used as an example of a broadcast entity. It should be understood that other broadcast entities, e.g., television, could be also be used, and that multiple broadcast entities could broadcast different versions of the same advertisement 20.

During broadcasting of advertisement 20, an individual 40 hears and/or sees the advertisement 20 being broadcast. For any of the variety of reasons discussed above, individual 40 does not remember a sufficient amount of the information contained in advertisement 10 so as to be able to purchase the goods and/or services. To effectively and efficiently retrieve information about the advertisement, individual 40 may connect to an Advertisement Content Server 70 via a computer 50 and the Internet 60.

As is well known in the art, connection to a content server such as Advertisement Content Server 70 may be accomplished in one of two general ways. If the Uniform Resource Locator (URL) address for Advertisement Content Server 70 is known, the server may be directly accessed via Internet 60 by use of a Hypertext Transport Protocol (HTTP) request. If the URL is not known, a world wide web search engine, e.g., Yahoo!®, may be employed to identify Advertisement Content Server 70.

Figure 2:
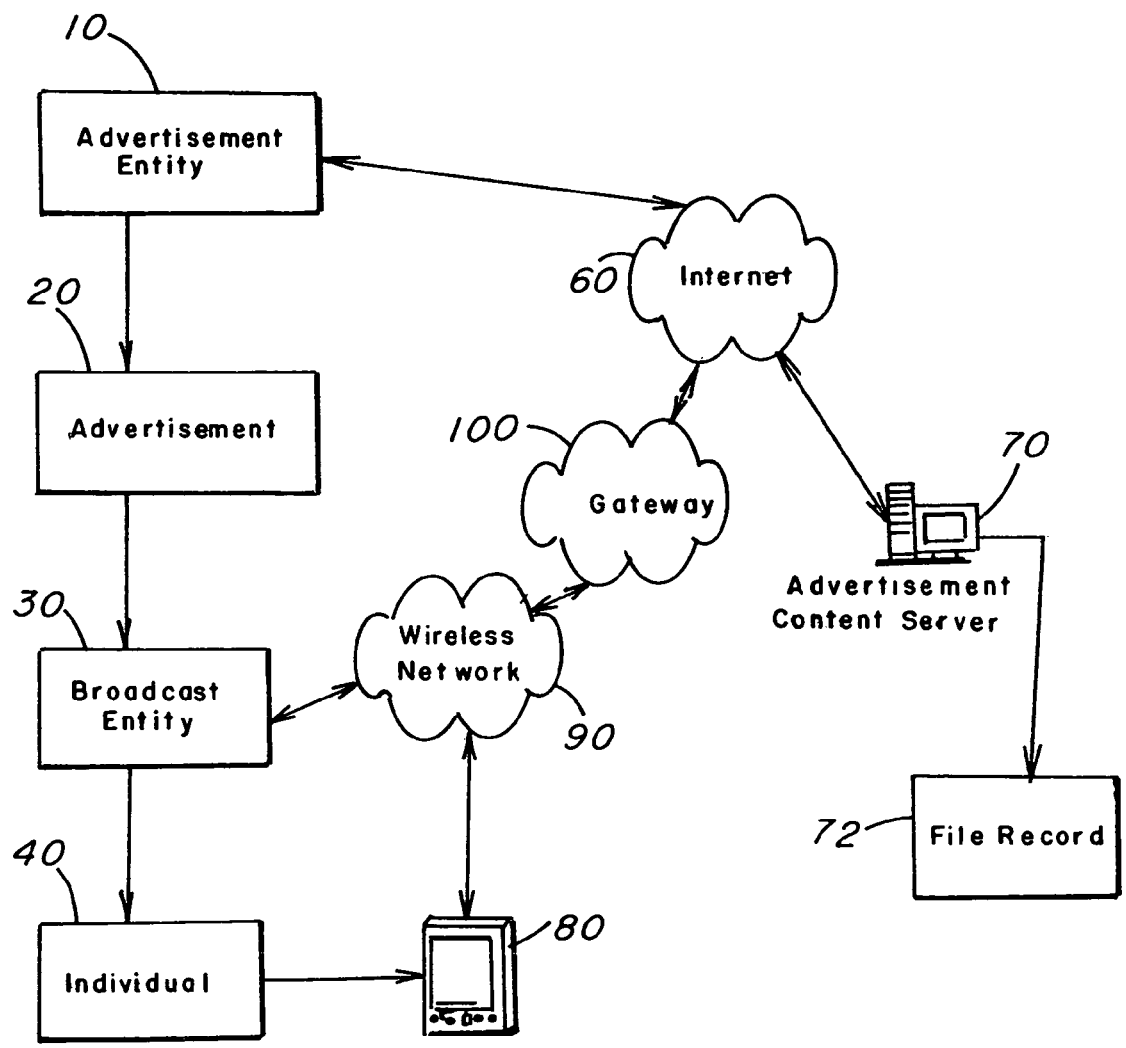
FIG. 2 is a schematic of an apparatus for retrieving information relating to an advertisement via a wireless device according to one embodiment of the invention.

Another option for accessing Advertisement Content Server 70 is via an interactive wireless system shown in FIG. 2. An interactive wireless device 80, e.g., a PDA, Blackberry RIM, or cell phone, is implemented to access Advertisement Content Server 70 via wireless communications network 90, gateway 100 and Internet 60. As is well known in the art, wireless device 80 communicates with wireless communications network 90, (an example of a wireless network is the Mobitex® network of the Cingular Interactive Intelligent Wireless Network service provided by Cingular Wireless). Gateway 100 functions as an interface between wireless device 80 and Internet 60.

It should be understood that the descriptions and illustrations of the apparatus used to access the Advertisement Content Server 70 are simplified to illustrate elements relevant for a clear understanding of the invention while eliminating, for purposes of clarity, other elements well known in the art. For example, it is well known in the art that a Wireless Application Protocol (WAP) is used when a wireless device is used to communicate with the Internet, and that Transmission Control Protocol (TCP) is one of several Internet protocols that can be used when accessing the Internet via computer 50.

If the device 80 is a WAP-enabled device, for example, the current location of the individual 40 may be ascertained by the server 70 upon the individual's access to the server. The server 70 may then present the individual with, for example, a list of billboards that are located in the vicinity of the device 80.

In order for the system to operate effectively, Advertisement Content Server 70 must be loaded with information relating to Advertisement 20. Although not necessary to the function of the apparatus and method described herein, information placed in Advertisement Content Server 70 may be constructed so as to allow advertisement information to be inputted and saved in a number of fields and sub-fields to ease accessibility. Illustrative examples of pertinent fields and sub-fields include broadcast entity names, broadcast entity geographic locations, advertisement names, advertisement owner names and advertisement owner contact information, e.g., phone number and email address. The format of any particular record relating to a particular advertisement can be predefined or arbitrary. Predefined fields are suitable and advantageous for information such as business address and contact numbers. Arbitrary formats may be particularly useful in fields in which the descriptive aspects of the advertisement are described.

Alternatively, the information may be arranged in a spreadsheet divided into discrete information segments. The information may be stored in a variety of electronic formats, e.g., HyperText Markup Language (HTML) and Wireless Markup Language (WML). It is to be understood that the information relating to Advertisement 20 may be input into Advertisement Content Server 70 via any of a number of sources, e.g., Broadcast Entity 30, Advertisement Entity 10 or any agent of the two accessing the Advertisement Content Server 70 via Internet 60, and via any gateway that may be needed to interface the information source with Internet 60.

The operating systems and graphic subsystems of computer 50, Advertisement Content Server 70 and wireless device 80 should support the creation of multiple on-screen windows, menus and other graphical interface features, particularly those capable of implementation with point-and-click devices, such as mouse devices, that are commonly known and used by those skilled to operate computers. For example, the information can be put into a spreadsheet format that includes fields directed to different facets of the advertisement information. The spreadsheet format can be created by word processing software that is compatible with a Microsoft Windows operating environment.

The various hardware components of the system described herein operate a task-specific software program that controls the creation of files to maintain information relating to each advertisement recorded in the memory of Advertisement Content Server 70. An advertiser may access information on the server 70 relating to its advertisements via, for example, a remote database client or the Internet 60.

To read advertisement data stored in the Advertisement Content Server 70, files relating to a specific advertisement have to be opened. Information relating to the file may be stored under a variety of categories. By way of example, information relating to a sporting goods advertisement, broadcast over a radio station located in Atlanta, Ga., may be stored under a general file for the radio station, a general file for the advertisement category and a general file for the advertisement owner. Each general file may contain fields relating to the topics covered by other general files. For example, a general file for radio stations broadcasting in the Atlanta, Ga. area may include fields listing radio stations included in the Atlanta, Ga. area, and a sub-field under each radio station field including information about advertisers having particular advertising slots. Alternatively, each broad category of information may have a designated field. Maintaining the same information under several different file categories and fields may ease the successful retrieval of the desired information.

An individual 40 who needs specific information concerning an advertisement 20 could register with the Advertisement Content server 70 as a frequent user and could provide certain information such as, for example, the individual's address and radio and/or television stations that the individual frequently listens to or watches. When a registered user accesses the server 70, the server 70 could present the user with a limited set of media outlets to search in order to determine the source of the advertisement 20.

Figure 3:
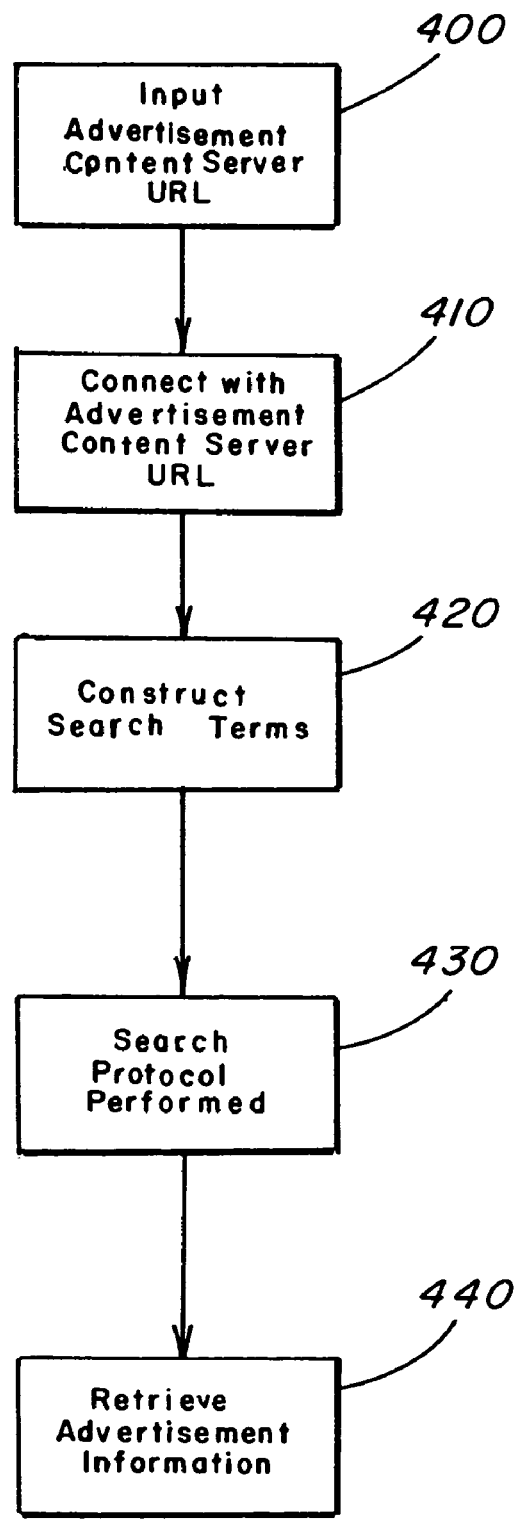
FIG. 3 is a flow diagram showing the accessing of advertisement information from a content server according to one embodiment of the invention.
Figure 5:
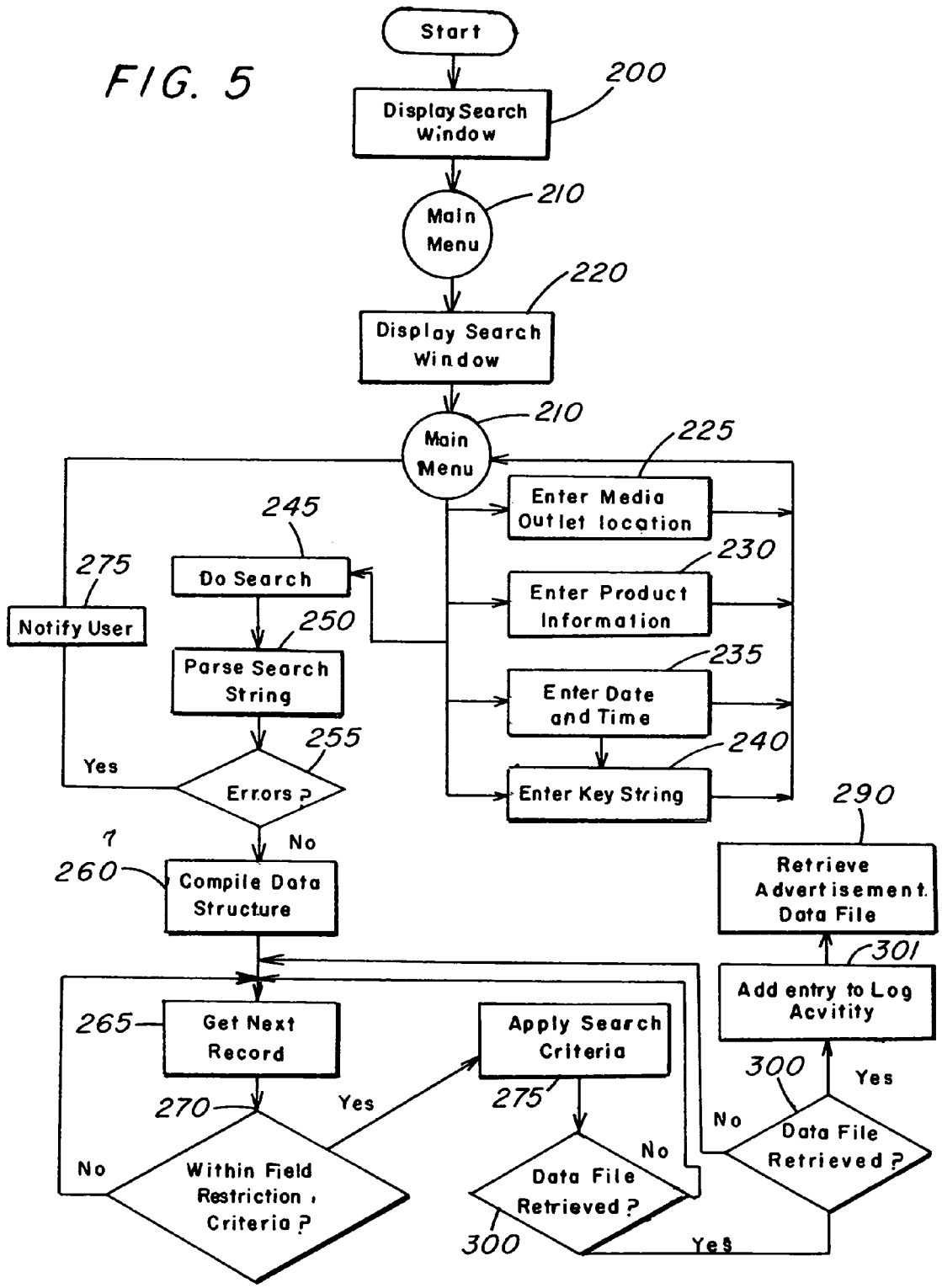
FIG. 5 is a flow chart of a search flow path according to one embodiment of the invention.

The process begins by accessing the Advertisement Content Server 70 by inputting the Advertisement Content Server URL into a computer 50 or wireless device 80 (step 400 in FIG. 3). Following connection with the Advertisement Content Server 70 (step 410), a search is conducted to locate a file record 72 relevant to the desired advertisement. The search begins with the input of terms remembered from the advertisement (step 420). A program for conducting the search, (described in detail below), is implemented to perform the searching function (step 430). In one illustrative embodiment, upon the successful location of a relevant file record 72 the file record is retrieved and viewed (step 440). Depending on the particular configuration of file record 72 and the program used to open the file record, one or more windows relating to the fields covered by file record 72 may be opened as shown in FIG. 5. Illustratively, these include, an advertiser name field, a broadcast entity field, a broadcast location field, an advertisement time slot field and an advertiser contact information field. Alternatively, a hyperlink to the advertising entity's website may also be provided.

To enable a user of the system to quickly retrieve specific information, such as the specifics about a particular product, which may not necessarily be broken down into discrete fields, a search function is provided.

FIG. 5 shows the basic components of the search function according to one embodiment of the invention. Activating search step 200 causes a search window 220 to appear. A user enters a text string that includes terms relating to the specific information desired into window 220. The search window optionally contains several fields, a broadcast entity field, a location field, a product field, a date and time field and a key field. A perform search function button is also included in the window. Known information is entered into one or more of the illustrative fields. A broadcast entity name, if known, is entered into a broadcast entity field (step 225). Broadcast entity location information, if known, is entered into the location field (step 230). Date and time information when the advertisement was seen or heard, if known, is entered in the date and time field (step 235). Any key words remembered from the advertisement that do not fit within any of the listed fields are entered in the key field (step 240). Boolean operators, as are well known in the art, may be employed.

To conduct a search, the do search button (245) is clicked. The key field is parsed (step 250), error checked (step 255) and assembled into an internal data structure to maximize the efficiency of the search (step 260). If any errors appear, the errors are shown in a window (step 295). If no errors are found, the data structure is compared to each record in the content server (steps 265, 270 and 275). If a match is made (step 280), the record is made available for retrieval (step 290). If a match is not made, the next record is retrieved (step 265).

If specific fields other than the key word field are utilized, each record is optionally first compared to the used fields. If the record fits within each field restriction criteria used, the record is compared to the data structure (step 260). If the field restriction criteria are not met, the next record is checked for field restriction compliance (step 265). If a record matches the field restrictions and data structure criteria, the record is made available for retrieval (step 290).

Figure 4:
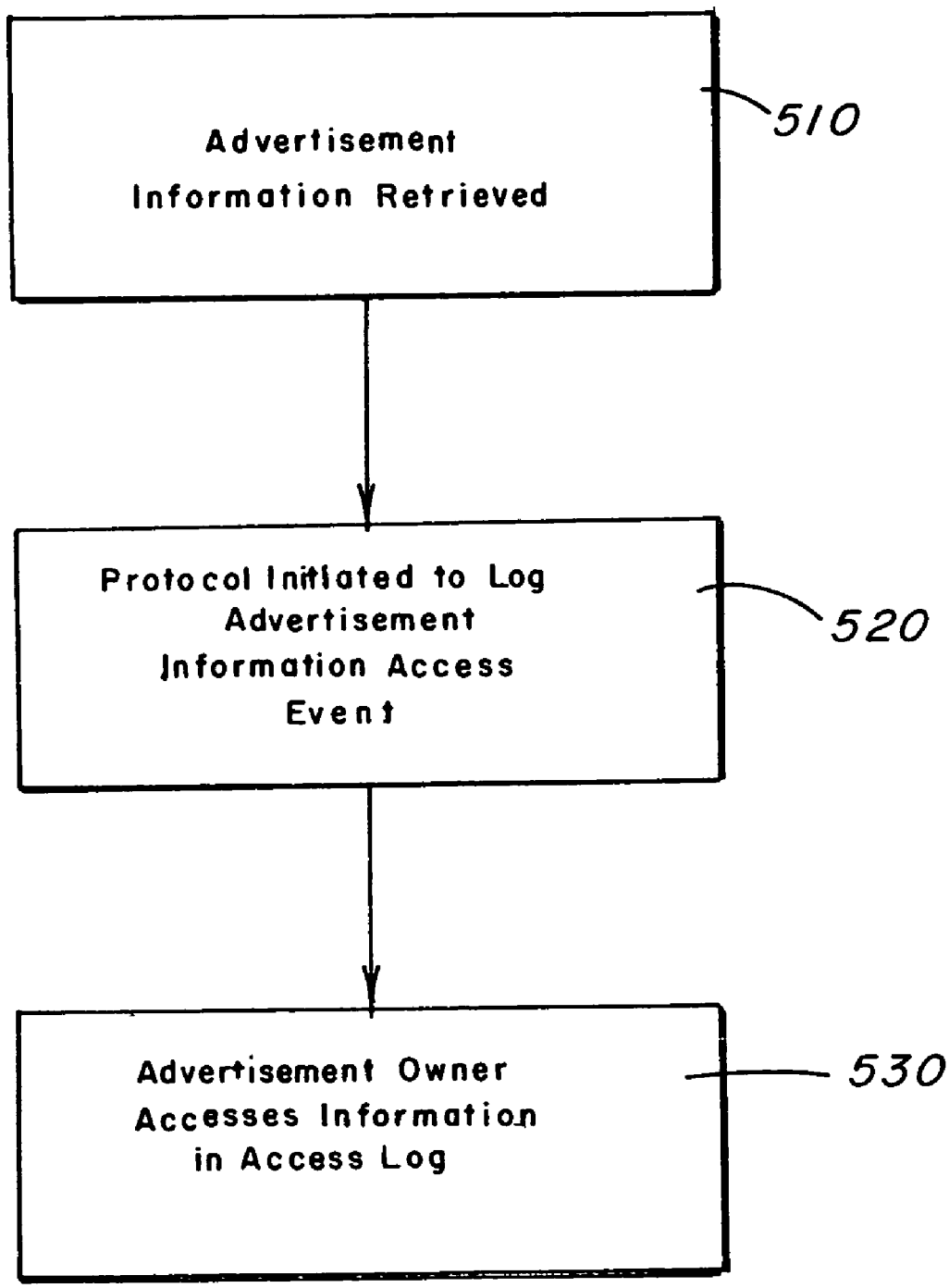
FIG. 4 is a flow diagram showing the recordation of marketing data relative to an advertisement according to one embodiment of the invention.

Optionally, a log is maintained in the Advertisement Content Server for each record retrieval event in a specific advertisement record (steps 300 and 301). As shown in FIG. 4, the log information may be made available to advertisers as a market saturation and market acceptance indicator in that each hit is the result of an interested customer, and not the result of an individual's random exposure to an advertisement as is often the case. Once a request to retrieve a file is input into the system (step 510), a software protocol is initiated to log the advertisement file access event (step 520). The access activity is maintained in a log that may be reviewed and optionally retrieved by the owner of the advertisement for which the file record pertains (step 530). The log may be optionally password-protected.

In another aspect of the invention, utilization of the Advertisement Content Server is filled with information and accessed only with the payment of scheduled fees. By way of example, an advertiser is required to pay for recordation of advertisement information on the Advertisement Content Server 70. The customer seeking information on Content Server 70 is required to pay a fee before a record can be successfully retrieved. Yet further payment alternatives are to institute subscriber fees for advertisers and/or customers or to charge advertisers based on site hits by customers.

The value to the customer is self-evident. The value to the advertiser is the potential for capturing a sale that may have otherwise been lost, and the ability to obtain marketing information about the effectiveness of the advertisement via the log information. Such information may be useful to identify preferable time slots, media outlets, and market saturation, among other uses. Additionally, the advertising entity can include additional unpublished advertisements in the content server database related to an advertisement published by a broadcast media outlet. The unpublished advertisements can be of a structure that will facilitate their retrieval with the published advertisement and viewed by a potentially interested customer without the need and expense of using media outlets to publicize the desired information.

The broadcast media outlet may also derive a benefit from the present invention. Log activity tied to hits relating to advertisements broadcast by a specific media outlet will give valuable information about the popularity of the specific media outlet. This information, in turn, may be used to set advertising rates and to determine which time slots are the most valuable. As such, the Advertisement Content Server 70 may also be required to pay fees to for the service.

It should be understood that the invention is not limited by the foregoing description of invention embodiments, but embraces all such alterations, modifications, and variations in accordance with the spirit and scope of the appended claims.

What is claimed is:

1. An advertisement content server for communicating information about a previously viewed advertisement, comprising:

a processor;

a memory coupled to the processor and storing a plurality of logics executable by the processor wherein the plurality of logics comprising:

logic in the advertisement content server configured to receive advertisement information associated with a plurality of advertisers;

logic in the advertisement content server configured to store the information as records within defined fields;

logic in the advertisement content server configured to provide at least two or more registration options for the user to register, the at least two or more registration options including at least two or more fields for receiving information regarding the user, the information regarding the user including an address of the user and at least one of the following: a radio station to which the user listens, and a television station that the user watches;

logic in the advertisement content server configured to provide, to a user, a search window that includes a plurality of search fields, the plurality of search fields configured to receive user-defined search criteria, the plurality of search fields including a first search field configured to facilitate a search of a predetermined first criteria, the first criteria being about the previously viewed advertisement, the previously viewed advertisement being broadcast by a broadcast media outlet, the plurality of search fields including a second search field configured to facilitate a search of a predetermined second criteria, the plurality of search fields including a key field configured to facilitate a search across the first search field and the second search field;

logic in the advertisement content server configured to receive a search request for the previously viewed advertisement from the user, the search request including at least one first term associated with the first criteria and at least one second term associated with the second criteria;

logic in the advertisement content server configured to receive the information regarding the user;

logic in the advertisement content server configured to perform a search function according to the at least one search term to determine a plurality of potential advertisements;

logic in the advertisement content server configured to limit the potential advertisements based on the received information regarding the user to determine a source of the advertisement;

logic in the advertisement content server configured to transmit to the user at least a portion of information resulting from the search function; and logic in the advertisement content server configured to maintain a log for each record retrieval event for each record, wherein the data associated with the log is made available to the broadcast media outlet that broadcast the advertisement to determine popularity of the broadcast media outlet.

2. The advertisement content server of claim 1, wherein the advertisement content server is configured to perform at least one of the following:

provide at least one advertiser access to the information via the Internet; and provide at least one advertiser with access to the information via a remote database client.

3. The advertisement content server of claim 1, wherein at least one field includes at least one of the following:

broadcaster identification information; and advertiser identification information.

4. The advertisement content server of claim 1, wherein the advertisement content server is configured to charge a fee for accessing the information.

5. The advertisement content server of claim 1, wherein the advertisement information includes unpublished advertisements available through the advertisement content server.

6. The advertisement content server of claim 1, wherein the criteria associated with the user includes an address of the user.

7. The advertisement content server of claim 1, further comprising, logic configured to provide to the advertiser, information to identify at least one preferable time slot, media outlet, and market saturation.

8. The advertisement content server of claim 1, wherein at least a portion of the data associated with the log is provided to the advertiser as a market saturation indicator.

9. A method for communicating information about previously viewed advertisement, comprising:

receiving, by a computing device, advertisement information associated with a plurality of advertisers;

storing, by the computing device, the information as records within defined fields;

providing at least two or more registration options, by the computing device, for the user to register, the at least two or more registration options including at least two or more fields for receiving information regarding the user, the information regarding the user including an address of the user and at least one of the following: a radio station to which the user listens, and a television station that the user watches;

providing, by the computing device, to a user, a search window that includes a plurality of search fields, the plurality of search fields configured to receive user-defined search criteria, the plurality of search fields including a first search field configured to facilitate a search of a predetermined first criteria, the first criteria being about the previously viewed advertisement, the previously viewed advertisement being broadcast by a broadcast media outlet, the plurality of search fields including a second search field configured to facilitate a search of a predetermined second criteria, the plurality of search fields including a key field configured to facilitate a search across the first search field and the second search field;

receiving, by the computing device, a search request from the user, the search request for the previously viewed advertisement including at least one first term associated with the first criteria and at least one second term associated with the second criteria;

receiving the information regarding the user by the computing device;

performing a search function, by the computing device, according to the at least one search term and determining a plurality of potential advertisements;

limiting the potential advertisements based on the received information regarding the user by the computing device and determining a source of the advertisement;

transmitting, by the computing device, at least a portion of information resulting from the search function to the user; and maintaining a log for each record retrieval event for each record by the computing device, wherein the data associated with the log is made available to the broadcast media outlet that broadcast the advertisement to determine popularity of the broadcast media outlet.

10. The method of claim 9, further comprising providing by the computing device at least one of the following:

at least one advertiser access to the information via the Internet; and at least one advertiser access to the information via a remote database client.

11. The method of claim 9, wherein at least one field includes at least one of the following:

broadcaster identification information; and advertiser information.

12. The method of claim 9, further comprising:

charging, at the computing device, the at least one advertiser a fee for accessing the information; and receiving, at the computing device, unpublished advertisements available through the advertisement content server.

13. A computer readable medium storing a plurality of executable logics executed by a computing device for communicating information about previously viewed advertisement, comprising:

logic executable by the computing device configured to instruct a programmable device to receive advertisement information associated with a plurality of advertisers;

logic executable by the computing device configured to instruct the programmable device to store the information as records within defined fields;

logic executable by the computing device configured to instruct the programmable device to provide at least two or more registration options for the user to register, the at least two or more registration options including at least two or more fields for receiving information regarding the user, the information regarding the user including an address of the user and at least one of the following: a radio station to which the user listens, and a television station that the user watches;

logic executable by the computing device configured to instruct the programmable device to provide, to a user, a search window that includes a plurality of search fields, the plurality of search fields configured to receive user-defined search criteria, the plurality of search fields including a first search field configured to facilitate a search of a predetermined first criteria, the first criteria being about the previously viewed advertisement, the previously viewed advertisement being broadcast by a broadcast media outlet, the plurality of search fields including a second search field configured to facilitate a search of a predetermined second criteria, the plurality of search fields including a key field configured to facilitate a search across the first search field and the second search field;

logic executable by the computing device configured to instruct the programmable device to receive a search request for the previously viewed advertisement, the search request including at least one first term associated with the first criteria and at least one second term associated with the second criteria;

logic executable by the computing device configured to instruct the programmable device to receive the information regarding the user;

logic executable by the computing device configured to instruct the programmable device to perform a search function according to the received terms to determine a plurality of potential advertisements;

logic executable by the computing device configured to instruct the programmable device to limit the potential advertisements based on the received information regarding the user to determine a source of the advertisement;

logic executable by the computing device configured to instruct the programmable device to transmit to the user at least a portion of information resulting from the search function; and logic executable by the computing device configured to maintain a log for each record retrieval event for each record, wherein the data associated with the log is made available to the broadcast media outlet that broadcast the advertisement to determine popularity of the broadcast media outlet.

14. The computer readable medium of claim 13, further comprising logic executable by the computing device configured to instruct the programmable device to provide at least one advertiser access to the information via at least one of the following: the Internet and a remote database client.

15. The computer readable medium of claim 13, wherein at least two or more fields includes at least one of the following: broadcaster identification information; and advertiser identification information.

16. The computer readable medium of claim 13, further comprising logic executable by the computing device configured to instruct the programmable device to charge a fee for accessing the information.

17. The computer readable medium of claim 13, wherein the advertisement information includes unpublished advertisements available through the advertisement content server.

* * * * *